US010387934B1

(12) United States Patent
Hoover

(10) Patent No.: US 10,387,934 B1
(45) Date of Patent: Aug. 20, 2019

(54) METHOD MEDIUM AND SYSTEM FOR CATEGORY PREDICTION FOR A CHANGED SHOPPING MISSION

(71) Applicant: Amazon Technologies, Inc., Reno, NV (US)

(72) Inventor: Thomas Jay Hoover, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 982 days.

(21) Appl. No.: 14/303,539

(22) Filed: Jun. 12, 2014

(51) Int. Cl.
*G06Q 30/00* (2012.01)
*G06Q 30/06* (2012.01)
*G06F 16/9535* (2019.01)

(52) U.S. Cl.
CPC ..... *G06Q 30/0625* (2013.01); *G06F 16/9535* (2019.01)

(58) Field of Classification Search
CPC ..................... G06Q 30/0625; G06F 17/30867
USPC ...................................................... 705/26.62
See application file for complete search history.

(56) References Cited

U.S. PATENT DOCUMENTS 6,167,393 A 12/2000 Davis, III et al.
6,466,918 B1 10/2002 Spiegel et al.
6,489,968 B1 * 12/2002 Ortega ................ G06F 3/0482 345/594
7,836,051 B1 11/2010 Mason
8,326,658 B1 12/2012 Lee et al.
8,516,308 B1 8/2013 Gill et al.
2005/0192934 A1 * 9/2005 Ellis .................. G06F 17/30017
2006/0064403 A1 3/2006 Rechterman et al.
2006/0111970 A1 * 5/2006 Hill ....................... G06Q 30/02 705/14.52
2009/0037410 A1 * 2/2009 Jones ................ G06F 17/30864
2009/0048860 A1 2/2009 Brotman et al.
2009/0199227 A1 * 8/2009 Kennedy ........... H04N 7/17318 725/13
2010/0169336 A1 * 7/2010 Eckhoff-Hornback ..................... G06Q 10/087 707/758
2011/0307839 A1 12/2011 Liao et al.
2012/0158537 A1 6/2012 Gonsalves et al.
2012/0185359 A1 * 7/2012 Chen ................ G06F 17/30424 705/26.63
2012/0265784 A1 10/2012 Hsu et al.
(Continued)

OTHER PUBLICATIONS

Interface Design Issues to Enhance Usability of E-Commerce Websites and Systems (Year: 2009).*
(Continued)

*Primary Examiner* — Jeffrey A. Smith
*Assistant Examiner* — Lalith M Duraisamygurusamy
(74) *Attorney, Agent, or Firm* — Kilpatrick Townsend & Stockton LLP

(57) ABSTRACT

Techniques for providing category predictions may be provided. For example, a process may attempt to improve a user experience when the user provides a search query. The process can predict the category associated with the search query, even when the category is not a keyword in the search query. Once the category is determined, data may be provided for the particular category, including data that enables an adjustment of a user experience. For example, when the category is apparel, the user experience may include an image-heavy layout and, when the category is books, the user experience may provide more text.

20 Claims, 10 Drawing Sheets

(56) References Cited

U.S. PATENT DOCUMENTS

2012/0296958 A1 11/2012 Isozu et al.
2013/0006914 A1 1/2013 Ray et al.
2013/0018918 A1 1/2013 Peek
2013/0080422 A1* 3/2013 Pan ........................ G06Q 30/00 707/722
2013/0097146 A1 4/2013 Lanphear et al.
2013/0268317 A1* 10/2013 Mattila .................. G06Q 30/02 705/7.29
2013/0332523 A1 12/2013 Luu et al.
2014/0143694 A1 5/2014 Tapley et al.
2014/0164385 A1* 6/2014 Liu ................... G06F 17/30705 707/740
2014/0324847 A1 10/2014 Tholiya et al.
2014/0344261 A1 11/2014 Navta et al.
2014/0365481 A1 12/2014 Malahy et al.
2014/0372218 A1* 12/2014 Talluri ............... G06Q 30/0256 705/14.54
2015/0074097 A1 3/2015 Lavine
2015/0161129 A1 6/2015 Miller et al.
2015/0312259 A1 10/2015 Alpha et al.

OTHER PUBLICATIONS

Kraaij et al., "The Importance of Prior Probabilities for Entry Page Search," *SIGIR '02 Proceedings of the 25th annual international ACM SIGIR conference on Research and development in information retrieval* (Aug. 11-15, 2002), pp. 27-34.
Set 4—Smoothing: Smoothing Language Models [online]. Chambers, 2012. Retrieved from the Internet: <URL: www_usna.edu/Users/cs/nchamber/courses/nlp/f12/slides/set4-smoothing.pptx>, 26 pages.
U.S. Appl. No. 14/303,504, U.S. Patent Application, filed Jun. 12, 2014, Titled: Category Predications With Browse Node Probabilities.
U.S. Appl. No. 14/303,516, U.S. Patent Application, filed Jun. 12, 2014, Titled: Category Predications for User Behavior.
U.S. Appl. No. 14/303,526, U.S. Patent Application, filed Jun. 12, 2014, Titled: Category Predications Identifying a Search Frequency.

* cited by examiner

METHOD MEDIUM AND SYSTEM FOR CATEGORY PREDICTION FOR A CHANGED SHOPPING MISSION

CROSS-REFERENCE TO RELATED APPLICATIONS

This application is related to and incorporates by reference for all purposes the full disclosure of U.S. patent application Ser. No. 14/303,504, filed Jun. 12, 2014, entitled "CATEGORY PREDICTIONS WITH BROWSE NODE PROBABILITIES" U.S. patent application Ser. No. 14/303,516, filed Jun. 12, 2014, and issued as U.S. Pat. No. 9,767,417 on Sep. 19, 2017, entitled "CATEGORY PREDICTIONS FOR USER BEHAVIOR" and U.S. patent application Ser. No. 14/303,526, filed Jun. 12, 2014, and issued as U.S. Pat. No. 9,767,204 on Sep. 19, 2017, entitled "CATEGORY PREDICTIONS IDENTIFYING A SEARCH FREQUENCY".

BACKGROUND

Users often provide search queries using search providers to find items online. However, the search queries may not accurately reflect what the user wants to see in their search results. For example, the user can provide "pumps" as a search query and want search results for women's shoes, but receive search results for bicycle pumps. As a result, the user may waste a significant amount of time altering and adjusting the search query, or simply give up using a particular search provider to find items.

BRIEF DESCRIPTION OF THE DRAWINGS

Various embodiments in accordance with the present disclosure will be described with reference to the drawings, in which.

DETAILED DESCRIPTION

Figure 1:
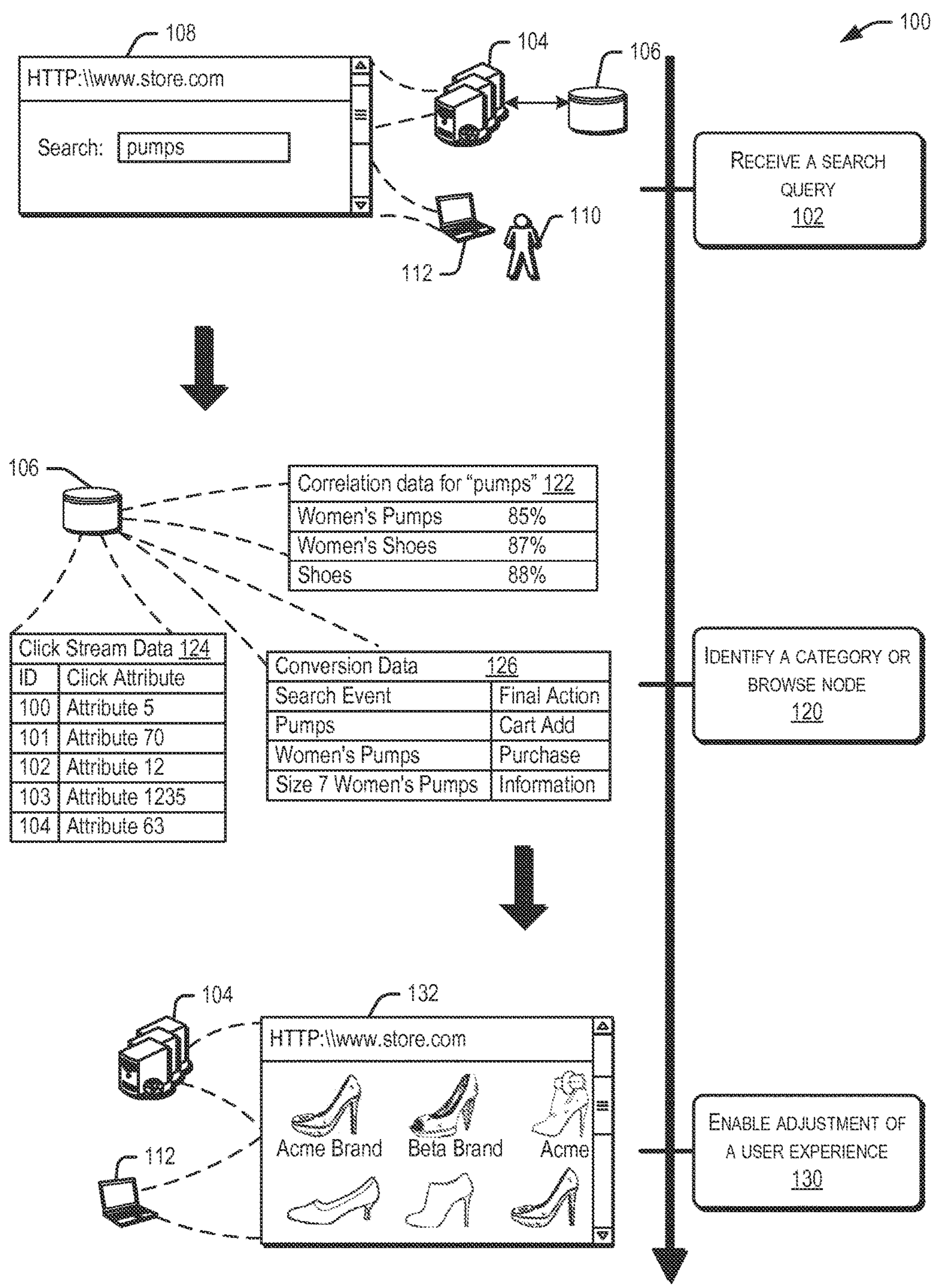
FIG. 1 illustrates an illustrative flow for providing category predictions described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing browse node or category predictions. For example, a process may attempt to improve a user experience when the user provides a search query. The process can predict the category associated with the search query, even when the category is not a keyword in the search query. Once the category is determined, data may be provided for the particular category, including data that enables an adjustment of a user experience. For example, when the category is apparel, the user experience may include an image-heavy layout and, when the category is books, the user experience may provide more text.

In an illustrative example, a user can browse to a search provider's website and provide a search query for an item. When the search provider searches its stored data for search results, a conceptual scope can be applied to the query in order to provide a better user experience. For example, the queries "shoes," "shoes for men," and "DVD player" correspond to multiple categories in a browse taxonomy graph. The user experience can be altered based on which categories correspond with the search query, so that when the category is "shoes," the user interface may display large icons of shoes for the user to browse. If the category is "electronics (e.g., DVD players)," the user interface may show more technical specifications than images of the devices to help users differentiate between devices.

The process of determining the category can vary. For example, the process can include one or more of a simple prediction, smoothed browse node prediction, expanded query group, N-Gram generative model, estimated probability as prior, or interpolation between multiple prediction models. After a query is received, the process of category predictions can predict the probability that the user will click, add, select, or otherwise activate an item (or other selection) in a particular browse node or category based in part on data or actions from other users, including historical data. The calculated probabilities can determine a set of relevant browse nodes or categories for the query. The predicted browse nodes or categories can be used to make decisions that adjust the user experience (e.g., change a display in the user interface, change an item ranking, etc.).

In another illustrative example, the category may be associated with a particular shopping mission. For example, a particular shopping mission (e.g., apparel shopping) may be identified from a search query. The user experience (e.g., large images) may correspond with the shopping mission. When a changed shopping mission is identified (e.g., food shopping), the user experience may also change to correspond with the new shopping mission.

A browse node may include a classification of an item. Some examples of browse nodes can include apparel, sporting goods, books, DVDs or other types of physical movie media, MP3, electronics, or other classifications of items. A browse node can comprise one or more categories and there may be multiple browse nodes associated with a category. In some examples, a category (e.g., shoes) is a broader version of a browse node (e.g., shoes for men). Categories may include one or more similar examples as illustrated for a browse node. For example, a browse node may include "electronics" and a category associated with the browse node can include televisions and mobile devices. As another example, the browse node can include apparel and a category associated with the browse node can include gender, women's apparel, or other specific types of apparel (e.g., shirts, pants, etc.).

The browse nodes and/or categories may be organized in a graph. For example, a graph can include representations of the relationships between browse nodes and categories. The graph can illustrate browse nodes that have multiple parents, browse nodes that cross, and/or browse nodes' parents that might be in different root-level categories. For example, "sporting goods" may contain various types of apparel, both of which can be a browse node and/or category (e.g., running shorts can be in both sporting goods browse nodes and apparel browse nodes). In another example, running shoes may be included in shoes and sporting goods browse nodes.

A search query or query (used interchangeably) can include one or more keywords and be used to help find information (e.g., items, recommendations, best-selling item providers, etc.). The search query can be provided in a standard query language or plain text. The search query may be received from a user, a system, or any other entity or device.

The search query can incorporate additional information associated with an item, including item identifiers, attributes, or categories that may not be displayed on an item's network page. The category (or browse node) may help describe an item, including the relevance of the item to the category. The description can be gathered from several sources, including metadata, data stores, and may vary by item. For example, item attributes associated with a box of cookies may include ingredients, manufacturer, origin country, weight of the box, description of the cookies, price, and flavors. In another example, item attributes for a movie on a digital video disc (DVD) may the name of the actors that star in the movie, shooting locations, producer, and year that the movie was released. In yet another example, item attributes for a laptop may include the processor speed, the amount of memory the laptop contains, the color of the casing, dimensions of the laptop, and the manufacturer. Other items may include item attributes that define whether the item was produced in a fair trade country or whether or not the products affect endangered species.

A data set may be associated with a search query. For example, data sets can include a set of potential search results, information associated with a search query, click data, item identifiers, a number of times the item identifier was ordered during a time frame, one or more items, one or more categories or browse nodes, one or more categories of items, one or more actions associated with the items, one or more actions associated with other users, a relevance of the one or more items for the keyword with the one or more actions, a number of searches for the items, keywords, a relevance value associated with a search term and an action, information associated with actions of other users, or other information relevant to a search query including search results.

The data set can also include information about a user's current behavior or historical behavior, including when a computing device loads a network page, including search-page loads, detail pages, cart adds, purchase events, or other information collected (e.g., through click stream data). The data may be analyzed to determine the probability that particular actions or selections resulted in conversions. The data set may be mapped to categories or browse nodes. The data set may also correspond with a time component, so that older data maybe weighted less heavily and/or have less of an effect on the predictability of a category or browse node as more recent data.

A conversion can include any action or selection of an item provided through a network page (e.g. order, click on, purchase, add to cart, etc.) and/or through an electronic marketplace. The conversion rate can be a number, percentage, or other measurement to determine the frequency at which the item is converted. In some examples, the conversion rate is compared to a threshold to identify whether the item is converted a minimum number of times to help with the prediction analysis. The number associated with the conversion or data set can exceed a threshold.

A prediction can include a likelihood that a particular conversion can occur. The prediction may incorporate a binary prediction (e.g., will or will not click on the link) instead of multinomial predictions (e.g., will click the item or will click somewhere else).

A user experience can include a visual, audio, or other representation of information that is enabled to be accessed by a user to provide information. A user interface associated with a display is one type of user experience. The user experience may also include providing a different layout on a user interface for the user to browse through data, a recommendation or advertisement for an item, a list of best-selling items, or any changes to a physical layout of a network page (e.g., navigation bars, layouts of information, filtering, ranking, scoping, etc.).

FIG. 1 illustrates an illustrative flow for providing category predictions described herein, according to at least one example. The process 100 can begin with receiving a search query 102. For example, a computer system 104 can interact with a data store 106 to access one or more objects to place on a network page 108. The network page can include a search tool or other methods of accepting a search query. A user 110 operating a user device 112 can provide a search query at the network page 108.

The process 100 may also identify a category or browse node 120. For example, the computer system may access the data store 106 to access one or more data sets. As illustrated, data sets may include correlation data 122. The correlation data 122 can include one or more browse nodes or categories and the prediction that the particular browse node or category corresponds to the search query. For example, when the search query includes "pumps," there may be an 85% likelihood that the user will click an item associated with "women's pumps," an 87% likelihood that the user will click on an item associated with "women's shoes," and an 88% likelihood that the user will click on an item associated with "shoes." In some examples, the predictions may incorporate binary predictions (e.g., will or will not click on the link) instead of multinomial predictions (e.g., will click the item or will click somewhere else).

The categorization may also be affected by pronouns, trademarks, or other keywords that identify multiple items. For example, a query may include "S." The query "S" may be associated with one book named "S" and created by J. J. Abrams. Based on past search history, most users who provide a search query "S" were likely looking for that book. The book may also be associated with seven different browse nodes, because the book is considered an adventure book, thrilling fiction book, etc. As such, the query "S" may be associated with the seven browse nodes and these seven different browse nodes are associated with a 98% likelihood that the user clicks on one of these browse nodes (e.g., concurrently using binary prediction).

The data sets can also include click stream data 124. The click stream data can include a list of links, items, or areas selected (e.g., clicked) by a user on a network page. As illustrated, one or more links, items, or areas on the network page can include identifiers or click attribute identifiers (e.g., Attribute 5, Attribute 70, etc.). The click stream data 124 may also incorporate a time component, where the progression of clicks is documented in the order the user selects the attributes (e.g., during a time frame). In some examples, as the user clicks anywhere in the webpage, network page, or application, the action is logged and analyzed. The click stream data may receive the data through various methods, including through the use of tracking cookies to generate a series of signals from browser applications used by a computing device.

The data sets can also include conversion data 126. The conversion data can include a search query (e.g., pumps, women's pumps, size 7 women's pumps, etc.) and an action associated with the search query. For example, when a particular user provided "pumps" as a search query, the action associated with the search query is to add the item to a digital cart (e.g., to purchase, order, or save the item for later viewing, etc.). In another example, when a particular user provided "women's pumps" as a search query, the action associated with the search query is to purchase the item. In yet another example, when a particular user provided "size 7 women's pumps" as a search query, the action associated with the search query is to request additional information about the item (e.g., by browsing to an item information network page or browsing to an item provider's network page, etc.).

The process may also include enabling an adjustment of a user experience 130. For example, the network page 132 may display data associated with the search query, category, browse node, or other information. The user experience may be adjusted in comparison with other user experiences with other search queries, categories, or browse nodes. As illustrated, an aspect of the user experience displays large images of items on the network page 132. In comparison, another user experience may display smaller images of items and more text than items on the network page 132. The user experience may incorporate the items or information on a network page differently based in part on the adjusted user experience.

In some examples, the user experience may be adjusted after the user provides the query. For example, the user may press "go" or otherwise transmit the search query from the network page to a server. In an embodiment, the server computer can access a data store that includes the correlation data 122, click stream data 124, conversion data 126, and other data when processing the search query and obtaining the search results.

The user interface is one sample aspect of the user experience. In some examples, the user experience may also include ranking, filtering, or scoping search results (e.g., items in an electronic marketplace). For example, when the category or browse node is identified as "apparel," items that are not associated with that category or browse node may be filtered or removed from the search results. More popular, active, or other orderings for these items may also be used without diverting from the essence of the disclosure.

Figure 2:
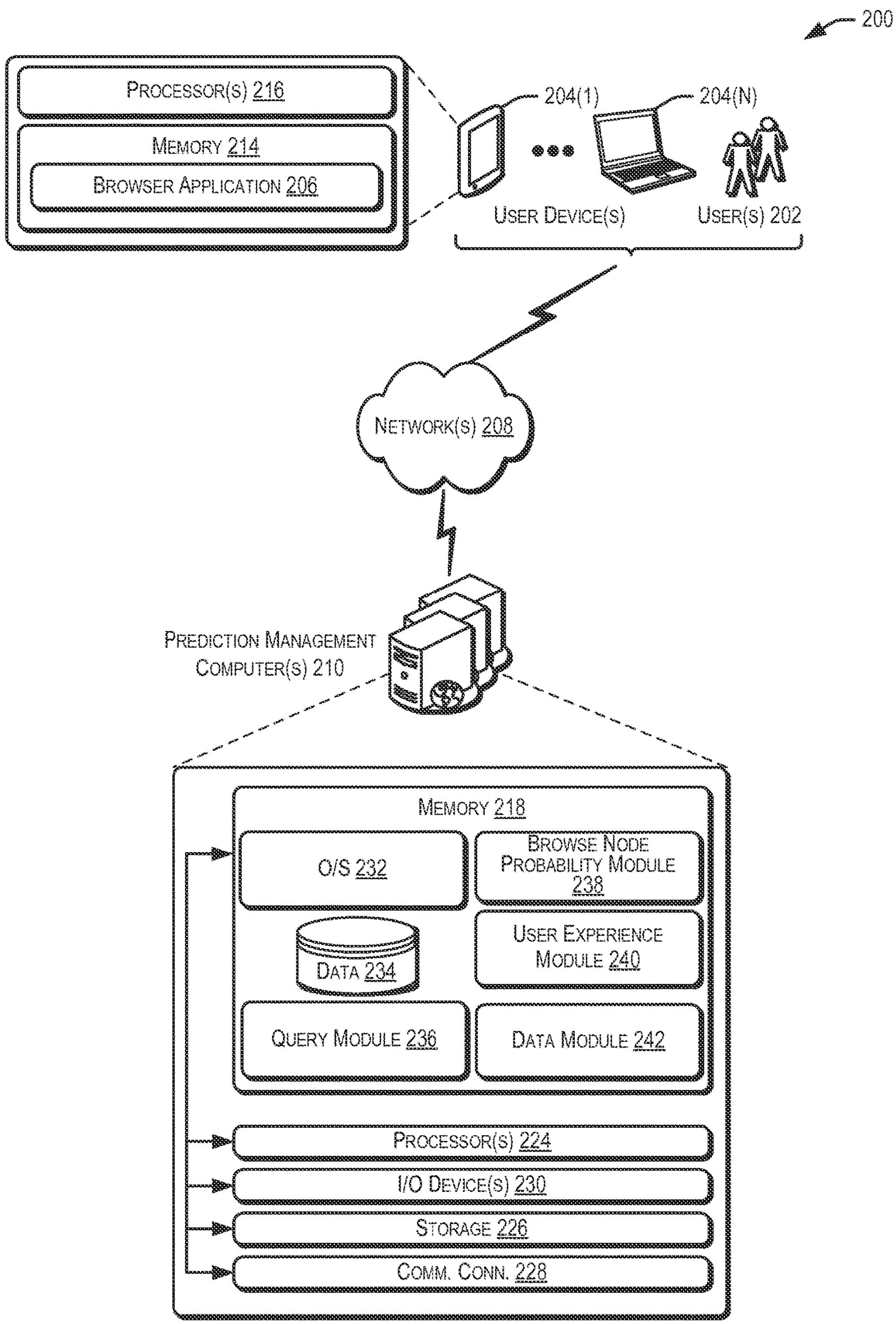
FIG. 2 illustrates an example architecture for providing category predictions described herein that includes a prediction management computer and/or a user device connected via one or more networks, according to at least one example.

FIG. 2 illustrates an example architecture for providing category predictions described herein that includes a prediction management computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more prediction management computers 210. The one or more prediction management computers 210 may, in some examples, provide computing resources such as, but not limited to, client entities, low latency data storage, durable data storage, data access, management, virtualization, cloud-based software solutions, electronic content performance management, etc. The one or more prediction management computers 210 may also be operable to provide web hosting, computer application development, and/or implementation platforms, combinations of the foregoing, or the like to the one or more users 202. The one or more prediction management computers 210, in some examples, may predict categories and/or identify shopping missions for a search query.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the prediction management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more prediction management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the prediction management computers 210 via the networks 208, or via other network connections. Additionally, the user devices 204 may be part of the distributed system managed by, controlled by, or otherwise part of the prediction management computers 210 (e.g., a console device integrated with the prediction management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the prediction management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the prediction management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the prediction management computers 210 may be in communication with the user devices 204 and/or other service providers via the networks 208, or via other network connections. The prediction management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the prediction management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of prediction management computers 210, the memory 218 may be volatile (such as RAM) and/or non-volatile (such as ROM, flash memory, etc.). The prediction management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the prediction management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the prediction management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The prediction management computers 210 may also contain communications connection(s) 228 that allow the prediction management computers 210 to communicate with a stored database, another computing device or server, user terminals and/or other devices on the networks 208. The prediction management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including a query module 236, a browse node probability module 238, a user experience module 240, and/or a data module 242. In some examples, the query module 236 may be configured to receive a search query. The search query may be received to help find information and/or provided in a standard query language or plain text. The query may be received from a user, a system, or any other entity or device.

The query module 236 may also be configured to parse a query (e.g., to identify one or more terms or phrases). For example, the search query may include "size 10 black pumps." The query can be parsed to include the terms "size" "10" "black" and "pumps." In some examples, the query module 236 may be configured to associate terms to each other, including "size" and "10" to form "size 10" as a single term or phrase. One or more of the terms of the search query may be associated with browse nodes or categories, so that, in some examples, a single search query can be associated with more than one browse node or category after it is parsed.

In some examples, the query module 236 may also be configured to identify related queries and/or reformulated queries (used interchangeably). For example, when users have historically provided a first query as "women's pumps" and a second query as "size 10 women's pumps," the queries may be related, such that "size 10 women's pumps" is one example of a reformulated query of "women's pumps." In another example, when a first query is "size 10 women's pumps" and a second query is "DVD player," the query module 236 may be configured to determine that the queries are not related. Whether the queries are related may be based in part on the historical data that other users have provided (e.g., queries, converted items, etc.).

Related queries may also be identified based in part on one or more terms that are added or removed from the query. The original query may be the first query and the query that adds or removes terms may be the second or subsequent query. For example, the first query may be "pumps," the second query may include "women's pumps," and the third query may include "size 7 pumps." The first, second, and third queries may be related.

The query module 236 may also be configured to identify a shopping mission and/or changed shopping mission. For example, the user can provide a first search query for "women's pumps" and a second search query for "asparagus." The query module 236 can identify that the shopping mission associated with the first query (e.g., shopping for shoes) is different than the shopping mission associated with the second query (e.g., shopping for food). In some examples, the changed shopping mission may be identified by different categories associated with the shopping missions (e.g., apparel vs. food).

The memory 218 may also include a browse node probability module 238. The browse node probability module 238 may be configured to determine a browse node or category using a process. For example, the process can include one or more of a simple prediction, smoothed browse node prediction, expanded query group, N-Gram generative model, estimated probability as prior, or interpolation between multiple prediction models. One or more of the processes may analyze behavioral data to help determine what the user wants to receive in return (e.g., through data in search results).

An illustrative process for determining a browse node or category is simple prediction. For example, the simple prediction can use impression and/or conversion information to calculate an estimate of the probability of a conversion (e.g., click, cart add, purchase, etc.) in a particular browse node. The query to browse node affinity (QBA) dataset can determine the probability as a signal for relevance. The simple prediction process can calculate probabilities for leaf browse nodes and/or calculate the probability of clicks for a particular item (e.g., by item identifier) for a browse node or any of its descendants (e.g., categories). The prediction may be weighted and/or adjusted for a time frame.

In some examples, the simple prediction may use the following formula:

$$P(\text{Click}_x \mid Q) = \frac{\sum_N w_x \text{Click}_x}{\sum_N w_x}$$

As illustrated in the formula, P may be the probability. $\text{Click}_x$ can be the observations of a click in browse node "x" and N can be the number of observations of query Q. The weight for the impression can be $w_x$.

In some examples, the process can incorporate behavioral, historical, and/or conversion data (e.g., data sets) to determine which items (e.g., by item identifiers) were converted after the user provides the query. For a particular query and a particular item identifier, the analysis may determine the number of times that the item was clicked, the number of times the item was added to cart, and/or the number of times the item was purchased. The analysis may produce the frequency that a particular item identifier was converted for a keyword and/or search query.

The frequency may be used to analyze a category or browse node. For example, the item identifiers may be associated with the browse nodes (e.g., in a tree data structure) and then the browse nodes may be mapped back to the browse node ancestors. For example, the keyword "pumps" includes a particular instance of a "woman's pump," that can be mapped to the browse nodes "shoes" and "women's pumps." With the correlation, any clicks to the "pumps" browse node can also be attributed to "shoes" and "women's pumps." The analysis may also determine the percentage of clicks occur within "shoes" and what percentage of clicks occur within "women's pumps." In some examples, the percentages across multiple browse nodes may be equal. For example, "shoes" and "women's pumps" may be associated with an 85% prediction (e.g., predicting that most clicks are within "women's pumps" and those clicks are also in "shoes").

Another illustrative process is smoothed browse node prediction. In some examples, the smoothed browse node prediction may provide predictions for queries associated with lower volumes (e.g., fewer queries submitted in relation to a particular browse node or category) by incorporating an observed prior distribution and/or smoothing (e.g., Laplace smoothing).

In some examples, the smoothed browse node prediction may use the following formula:

$$P(\text{Click}_x \mid Q) = \frac{\sum_N w_x \text{Click}_x + \alpha}{\sum_N w_x + \alpha / P(\text{Click}_x)}$$

As illustrated in the formula, a may be a smoothing factor (e.g., where the smoothing factor is a number), $\text{Click}_x$ can identify the observations of a click in browse node "x" and "N" may be the number of observations of query "Q." The $w_x$ may be the weight for this impression and $P(\text{Click}_x)$ can identify a prior for clicks in browse node x.

For example, the prior probability for clicking on "pumps" in a low volume browse node may be based on one observation during a time frame (e.g., one person issued the query for "pumps"). Given the one instance, the user may have clicked on an item for "pumps." The prediction may expect that if there is one click, it was in that particular category, or 100%. However, the prediction may be skewed with thousands of keywords available. In some cases, the prediction may incorporate the number of possible cases, so that the number of possible categories (e.g., "1") over the number of possible categories (e.g., thousands), would equal the probability of clicking on any one of the possible categories. In this example, the prediction may equal a relatively low probability.

With smoothing, not all keywords correspond with enough data in a time frame to generate an accurate prediction. For example, "pumps" may receive several thousand searches per day, but "size 7 red pumps" might receive only a few searches per day (or hour, month, etc.). The smoothing process may be used to eliminate noise in the data. For example, if one person per day is providing the query and that one person clicks on one particular category (e.g., 100% of the searches for the category in the time frame), the smoothing may adjust the prior probability of the click on the particular category to something less than 100% (e.g., not relying solely on the small amount of data available for the time frame).

The prior may be calculated using various processes. One process is to review a particular browse node and calculate the probability of click in that browse node, given that the user clicks on anything (e.g., regardless of what keyword the user entered). For example, the process can count the total number of clicks in a browse node and total number of clicks anywhere to determine the probability that they click on that browse node.

Other processes for determining the prior may also be used. For example, the process may analyze similar search queries (e.g., and/or their corresponding conversion rates), expand the group of queries (e.g., to include similar keywords), or build probability distribution models to determine the prior. Some of these processes are used in relation to other processes for determining a browse node or category illustrated herein.

Another illustrative process for determining a browse node or category is expanded query group. For example, when a number of search queries associated with a particular browse node or category is relatively low, one way to expand the amount of data available for a query is to consider the related queries that reflect the same shopping mission (e.g., similar queries) until an item is converted. For example, a series of queries may consist of queries "shoes" followed by the query "running shoes." The process may indicate a single shopping mission.

The analysis can generate an identifier that helps determine whether the shopping mission has changed between queries. The identifier may be associated with search queries for the shopping mission, with relative strength based on proximity. Features for this identifier can include token and character edit distance, query fingerprint, and various linguistic features. An expanded query group can be generated and include a higher volume of queries (e.g., allowing for a better prediction).

In some examples, the process may help gather more data for low volume queries and/or generate a relatively accurate prior to help with future predictions. The process may also determine when query-scoping decisions have been made incorrectly. For example, when the original query scope applied, actions may be weighted more heavily for subsequent queries based on some parameter. In an example, expanded query group process may analyze a larger set of data for the query "size 7 red pumps," so that the analysis includes that query plus some other queries that are similar to the original query (e.g., based on reformulation, based on users changing their query, etc.). The data set associated with the expanded query group may be used to predict the likelihood of a conversion for "size 7 red pumps."

Another illustrative process for determining a browse node or category is N-Gram generative/probability distribution. In some examples, an N-Gram generative model, linguistic generative model, or natural language processing model (used interchangeably) can be used to calculate a prediction for queries based on similar queries.

A data set may include individual keywords as signals and the N-Grams can include one or more tokens. For example, for the search query "size 7 red pumps," the analysis may include the probabilities for the keywords "size," "size 7," "7 red," "red," "7," "red pumps," and "pumps." The keyword "pumps" may be associated with the highest signal of the analyzed keywords (e.g., more people are providing the query "pumps" than the other terms). In some examples, probability distribution for the keyword "pumps" may be substituted for the prior for the low volume "size 7 red pumps" query.

Another illustrative process for determining a browse node or category is estimated probability as prior. For example, an estimated probability for a query may be based on an expanded query group, a linguistic generative model, or other models, such as clustering. These processes can be used to generate the probability as a prior to blend with the observations of that query based on the smoothing algorithm above. In some examples, the prior can be determined from any of the processes discussed herein, including from a generative model or from expanding the query group.

In some examples, the estimated probability as prior may use the following formula:

$$P(\text{Click}_x \mid Q) = \frac{\sum \text{Click}_x + \alpha}{N + \alpha / P_{est}(\text{Click}_x \mid Q)}$$

As illustrated in the formula, a may be a smoothing factor (e.g., 0 . . . N), $\text{Click}_x$ can identify the observations of a click in browse node "x," and "N" may be the number of observations of query "Q." The $w_x$ may be the weight for this impression and $P_{est}(\text{Click}_x|Q)$ can identify a prior for clicks in browse node "x" using an N-Gram-based estimate.

Another illustrative process for determining a browse node or category is interpolation between multiple prediction models. For example, the prediction may be based in part on more than one process for prediction, blend or interpolate many prediction models, and/or determine an aggregated prediction. The probability distributions for multiple different processes may be determined and a process (e.g., a learning algorithm) can determine a blend amongst the probability distributions to get a relatively accurate probability distribution.

In some examples, the interpolation between multiple prediction models may use the following formula:

$$P(\text{Click}_x|Q)=\Sigma\lambda_n P_n(\text{Click}_x|Q)$$

As illustrated in the formula, $\lambda_n$ may be the learned parameters and $P_n(\text{Click}_x|Q)$ may define the probability of click given the search query.

Another illustrative process limits the use of a prediction process. For example, some relatively low volume queries may include a small number of results (e.g., because the user searches for a particular item, brand name, model number, etc.). The conversion rate for these queries (e.g., shopping missions) may be relatively high as well (e.g., as soon as the user finds the item "Acme Brand pink size M t-shirt from 2014," the user orders the item). In some of these examples, no process for determining a browse node or category may be implemented.

Other analysis may be performed as well, including the generation and use of query fingerprints. Additional information on this process is included with U.S. application Ser. No. 14/217,003, the contents of which are incorporated by reference for all purposes.

A reverse search index may be implemented. The reverse search index can receive a query and matches the query and/or keyword in the query to a set of documents (e.g., documents of items). The search engine can incorporate at least two components, including a matching number structure and relevance component. The matching number structure can determine for a particular query, which documents match the criteria specified in the query. The relevance component can determine, for a particular document, what is the score for this document given the user's query. A machine-learned process may also be implemented for calculating the relevant score for a particular item (e.g., using one or more data sets, using the query to browse node affinity (QBA) data, etc.) to help determine relevance.

The process may incorporate a reformulation data as well. The reformulation data may include one or more search queries that the user provides to get more accurate search results in a single shopping mission. For example, a query may be received for "red pumps," then "black pumps," and then "pumps." A reformulation analysis (e.g., reformulation graph) may be generated for "red pumps" that includes other common alternatives that are associated with the original query (e.g., from a particular computing device, during a time frame, etc.).

Reformulation data may also include conversion data, click stream data, or other data. For example, the reformulation can be analyzed while a browser application is used (e.g., determined between the time that the browser application is opened until it is closed) and/or a session identifier is active. In another example, the data can include items that users converted (e.g., purchased) after providing a particular query to identify a changed shopping mission (e.g., shopping mission ends when the user pays for items).

The memory 218 may also include a user experience module 240. The user experience module 240 may be configured to enable an adjustment of a user experience and/or adjustment of a user interface. A user interface associated with a display is one type of user experience. The user experience module 240 may be configured to provide a different layout on a user interface for the user to browse through data, a recommendation or advertisement for an item, a list of best-selling items, or any changes to a physical layout of a network page (e.g., navigation bars, layouts of information, filtering, ranking, scoping, etc.).

For example, the query may include "Harry Potter." The browse nodes or categories can include a 40% chance that the user wants search results associated with a movie, 20% chance the user intended search results for a book, and 5-10% chance that the search results should include a costume, toy, or games. With the ambiguity, the user experience can include a diverse selection of items, including a mix of costumes, movies, and books. In some examples, the user experience can include federations, including a horizontal stripe of movies, a horizontal stripe of books, and a horizontal stripe of costumes.

In some examples, the user experience can provide one or more browse nodes in depth instead of a broader approach. For example, the layout can include more items for movies, since 40% of the previous queries for "Harry Potter" converted an item associated with that category. In other examples, a logical set of two to four categories can be selected that cover a majority of cases while presenting the most diversity (or a number of queries over a threshold).

The memory 218 may also include a data module 242. The data module 242 may be configured to access a data set (e.g., from the data store). For example, the data module 242 can access various types of data from the data store, as illustrated in FIG. 1.

The data module 242 may also be configured to compare data (e.g., historical data) with threshold(s). For example, the data module 242 may provide a browse node or category when the predictability associated with the browse node or category for a particular search query is above a value (e.g., above 50%). In some examples, the threshold may be associated with a time period (e.g., collect data for at least 30 days or 2 hours). When some value exceeds a threshold (e.g., the number of searches for "women's pumps" is greater than 10 searches in a day), an action may be performed (e.g., providing data).

The data module 242 may also be configured to provide data that corresponds with the browse node and/or shopping mission. For example, the data (e.g., items, recommendations, advertisements, navigation strips, etc.) may be displayed on a user interface. In other examples, the data may be provided to a user (e.g., via a notification to a user device).

Figure 3:
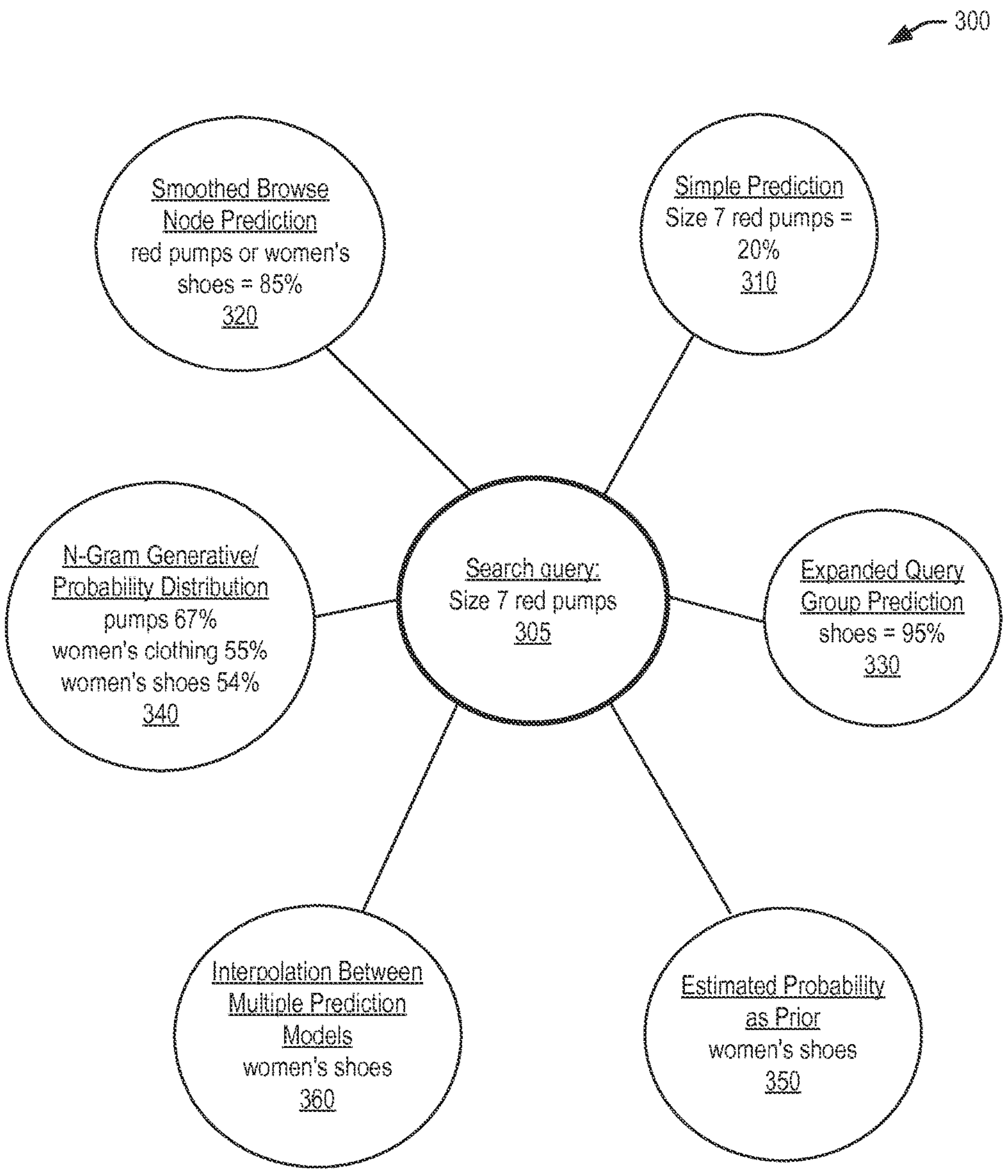
FIG. 3 illustrates some examples of processes for predicting a category or browse node described herein, according to at least one example.

FIG. 3 illustrates an illustration for predicting a search category described herein, according to at least one example. The process 300 may begin with a search query 305 and identify a category, data set, or shopping mission based on a portion of the search query. For example, the query may include "size 7 red pumps."

At 310, a simple prediction can be used to determine the browse node or category, as illustrated with the browse node probability module 238. For example, simple prediction can determine that the appropriate browse node for the query is "size 7 red pumps." In a binary prediction model, the user may have a 20% likelihood of converting an item associated with this browse node when the initial query is "size 7 red pumps" (e.g., based on previous conversion rates by other users).

At 320, a smoothed browse node prediction can be used to determine the browse node or category, as illustrated with the browse node probability module 238. For example, smoothed browse node prediction can determine that appropriate browse nodes for the query is "women's shoes" or "red pumps," because there are more queries received from other users for "women's shoes" than "size 7 red pumps" in a particular time frame. In a binary prediction model, the user may have an 85% likelihood of converting an item associated with "women's shoes" browse node or the "red pumps" browse node when the initial query is "size 7 red pumps."

At 330, an expanded query group prediction can be used to determine the browse node or category, as illustrated with the browse node probability module 238. For example, expanded query group prediction can determine that an appropriate browse node for the query is "shoes." In a binary prediction model, the user may have a 95% likelihood of converting an item associated with "shoes" browse node when the initial query is "size 7 red pumps."

At 340, a N-Gram generative model prediction can be used to determine the browse node or category, as illustrated with the browse node probability module 238. For example, using a linguistic similarity between the query and other browse nodes that are available, the N-Gram generative model can determine that the appropriate browse nodes can include "pumps," "women's clothing," and "women's shoes," where the browse nodes can correspond with particular likelihoods of a conversion.

At 350, an estimated probability as a prior prediction can be used to determine the browse node or category, as illustrated with the browse node probability module 238. For example, estimated probability as a prior prediction can determine that appropriate browse nodes for the query is "women's shoes," because there are more queries received from other users for "women's shoes" than "size 7 red pumps" in a particular time frame.

At 360, an interpolation between multiple prediction models can be used to determine the browse node or category, as illustrated with the browse node probability module 238. For example, the process may use simple prediction, smoothed browse node prediction, and N-Gram generative model prediction to determine one or more browse nodes or categories. The interpolation between multiple prediction models may determine that "women's shoes" is the best process for the received query (e.g., highest ranked, highest prediction percentage based on conversion rates and/or other user, etc.).

Figure 4:
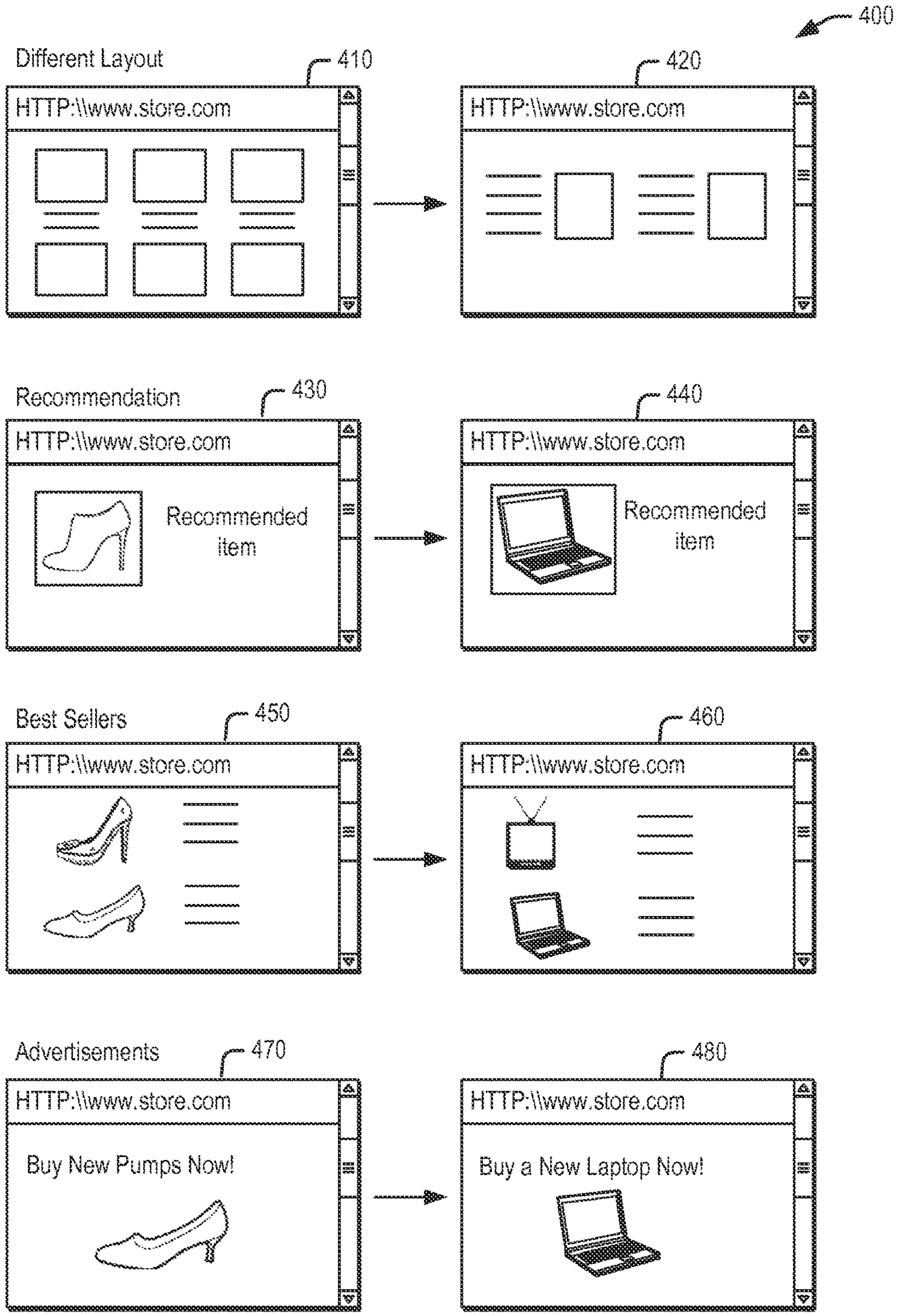
FIG. 4 illustrates some examples of user experiences described herein, according to at least one example.

FIG. 4 illustrates some examples of user experiences 400 described herein, according to at least one example. For example, adjusting the user experience can include providing a different layout. One user experience 410 may include a layout on a user interface that is image-heavy while another user experience 420 may include more text. The different layouts may allow the user to browse through the data provided in response to the search query and/or search results.

The user experience 430, 440 may include a recommendation. For example, when the category or browse node is associated with pumps or shoes, the user experience 430 may provide pumps or shoes as a recommendation. In another example, when the category or browse node is associated with electronics, the user experience 440 may provide a particular item as a recommended item that is associated with the category electronics. In some examples, the recommended item(s) may or may not match the search query, but the recommended items can be related to one or more categories associated with the search query.

The user experience 450, 460 may include a display of best-selling items from a category. For example, when the category or browse node is associated with pumps or shoes, the user experience 450 may provide the best-selling pumps or shoes for the display on a user interface of a computing device. In another example, when the category or browse node is associated with electronics, the user experience 460 may provide one or more best-selling items that are associated with the category electronics.

The user experience 470, 480 may include an advertisement for an item associated with a category. For example, when the category or browse node is associated with pumps or shoes, the user experience 470 may provide an advertisement to purchase pumps. In another example, when the category or browse node is associated with electronics, the user experience 480 may provide an advertisement to purchase an item associated with the category electronics. In some examples, the advertisements are limited to a user based on a shopping mission (e.g., advertisements related to the current shopping mission) and/or provided during a relevant time frame.

Figure 5:
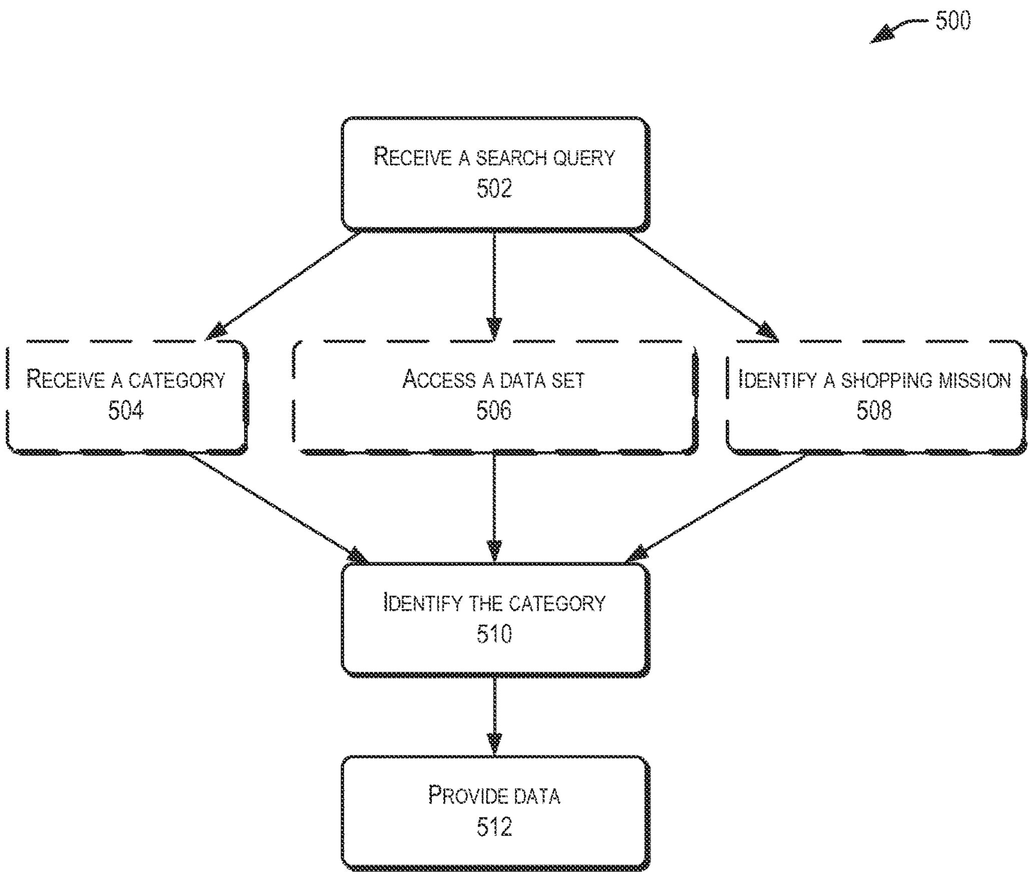
FIG. 5 illustrates an illustrative flow for providing category predictions described herein, according to at least one example.

FIG. 5 illustrates an example flow diagram for predicting a search category described herein, according to at least one example. In some examples, the one or more prediction management computers 210 (e.g., utilizing at least one of the query module 236, the browse node probability module 238, the user experience module 240, and/or the data module 242) or one or more user devices 204 shown in FIG. 2 may perform the process 500 of FIG. 5. The process 500 may begin at 502 by receiving a search query. The search query may be received from a user, system, data store, or other entity and include one or more keywords. At 504, the process 500 may optionally include receiving a category associated with the search query. At 506, the process 500 may optionally include accessing a data set. At 508, the process 500 may optionally include identifying a shopping mission. At 510, the process 500 may receive or identify the category. Further in some examples, the process 500 may end at 512, where the process 500 may include providing data.

Figure 6:
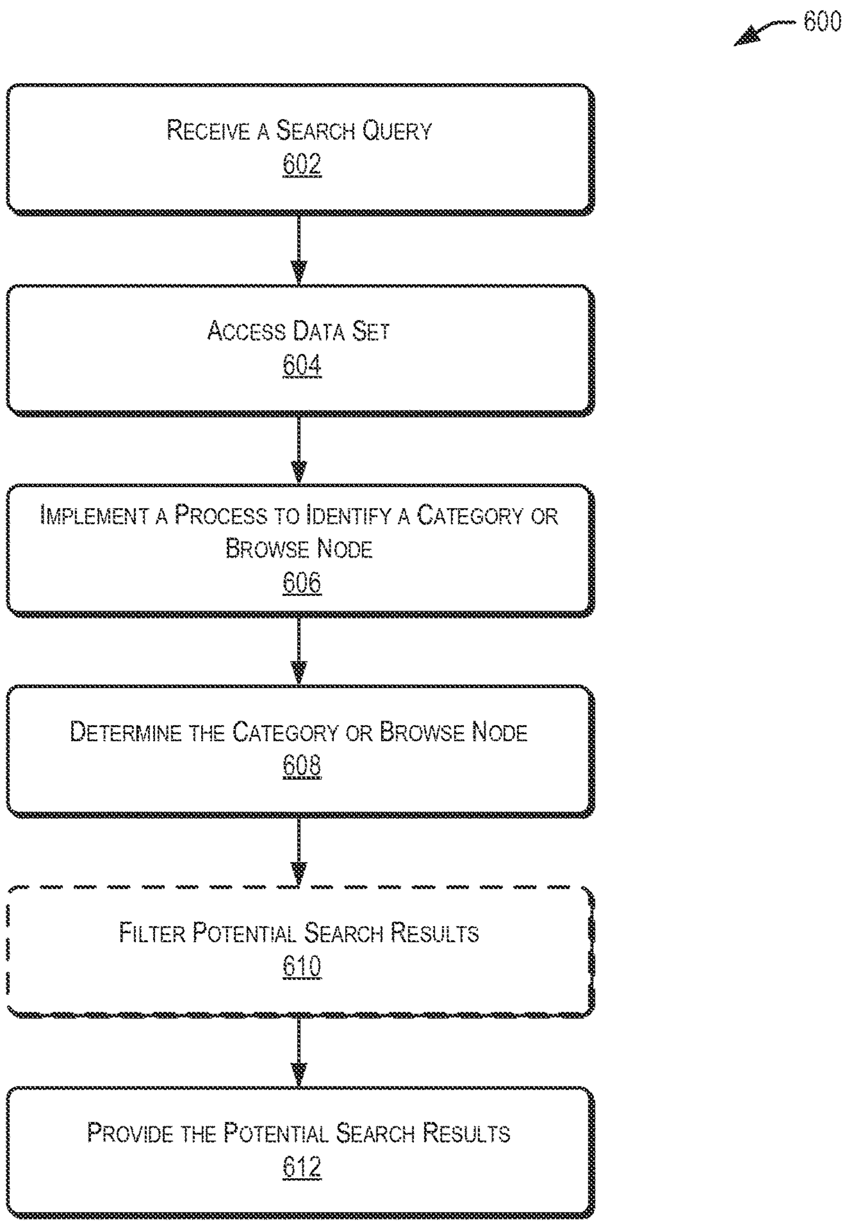
FIG. 6 illustrates an example flow diagram for providing category predictions described herein, according to at least one example.

FIG. 6 illustrates an example flow diagram for predicting a search category described herein, according to at least one example. In some examples, the one or more prediction management computers 210 (e.g., utilizing at least one of the query module 236, the browse node probability module 238, the user experience module 240, and/or the data module 242) or one or more user devices 204 shown in FIG. 2 may perform the process 600 of FIG. 6. The process 600 may begin at 602 by receiving a search query. For example, the search query can include one or more keywords. At 604, the process 600 may include accessing a data set. For example, the data set can include a set of potential search results. In some examples, the data set can comprise click data, an item identifier, and a number of times the item identifier was ordered during a time frame.

At 606, the process 600 may include implementing a process to identify a category or browse node. For example, the process can include one or more of the following: simple prediction, smoothed browse node prediction, expanded query group, N-Gram generative model, estimated probability as prior, or interpolation between multiple prediction models. At 608, the process 600 may include determining the category or browse node. The category or browse node may be determined from the process. At 610, the process 600 may optionally include filtering potential search results. For example, the set of potential search results may be filtered to include a portion of the set of potential search results that correspond with the category or browse node.

Further in some examples, the process 600 may end at 612, where the process 600 may include providing the potential search results. For example, the portion of the set of potential search results can correspond with the category or browse node to the user. The portion of the set of potential search results can be enabled to adjust a user interface associated with a display provided to the user and/or user experience. In some examples, adjusting the user experience provides a different layout on a user interface for the user to browse through the portion of the set of search results, provides a recommendation for items associated with the category, provides a display of best-selling items from the category on a user interface of the computing device, or provides an advertisement for a second item associated with the category.

Figure 7:
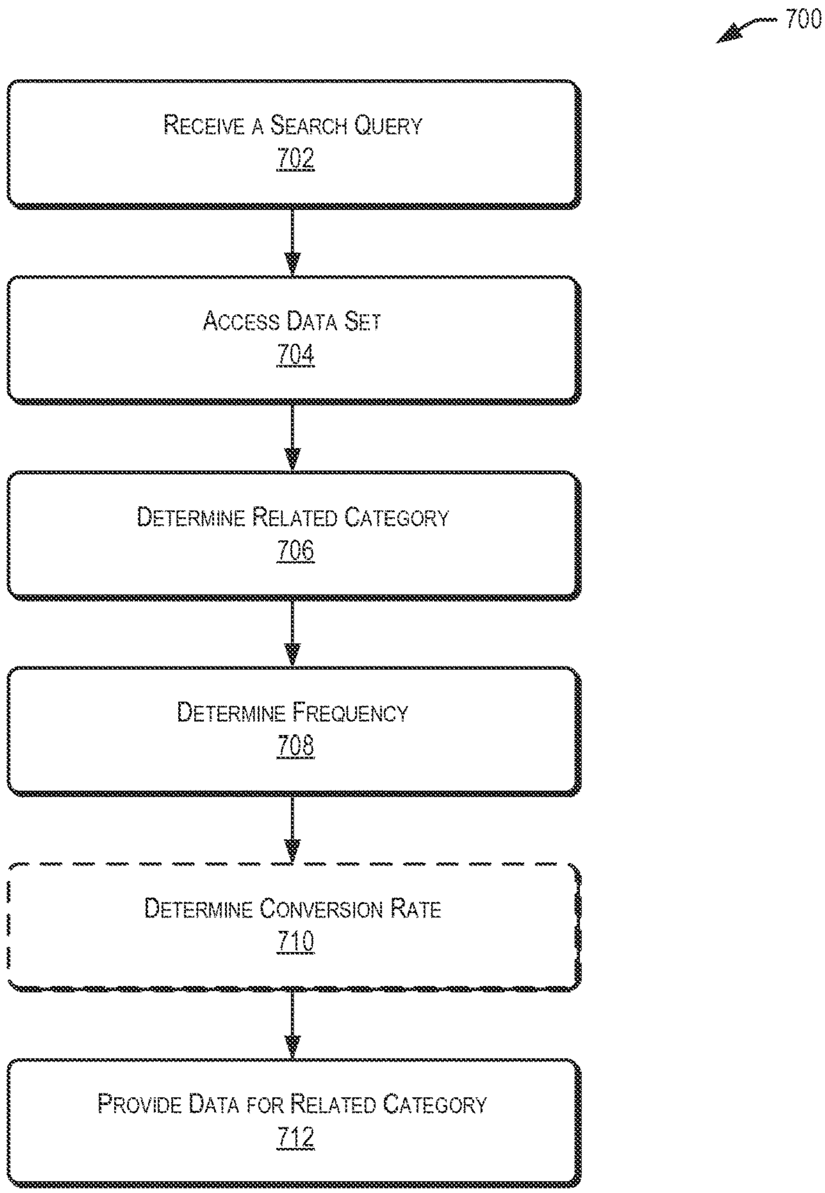
FIG. 7 illustrates an example flow diagram for providing category predictions described herein, according to at least one example.

FIG. 7 illustrates an example flow diagram for predicting a search category described herein, according to at least one example. In some examples, the one or more prediction management computers 210 (e.g., utilizing at least one of the query module 236, the browse node probability module 238, the user experience module 240, and/or the data module 242) or one or more user devices 204 shown in FIG. 2 may perform the process 700 of FIG. 7. The process 700 may begin at 702 by receiving a search query. The search query can include a keyword. In some examples, the keyword can be associated with an item identifier. At 704, the process 700 may include accessing a data set. For example, the data set can include one or more items, one or more categories of items, one or more actions associated with the items and other users, and/or a relevance of the one or more items for the keyword with the one or more actions.

At 706, the process 700 may include determining a related category. For example, at least one related category may be determined for the one or more categories of items. At 708, the process 700 may include determining a frequency. For example, the frequency of the at least one related category may be determined to be greater than a first threshold. In another example, the frequency may be determined by an occurrence of the at least one related category with the other users. At 710, the process 700 may optionally include determining a conversion rate. For example, the conversion rate may be determined for at least one related category by the other users. The conversion rate may be compared with a second threshold. In some examples, the conversion rate may be associated with a number of times the item identifier was ordered and/or selected (e.g., converted) by other users during a time frame.

Further in some examples, the process 700 may end at 712, where the process 700 may include providing data for the related category. For example, when the frequency of the at least one related category is greater than the first threshold and the conversion rate is greater than the second threshold, the data associated with the at least one related category may be provided to the user. In some examples, the data is enabled to adjust a user experience.

Figure 8:
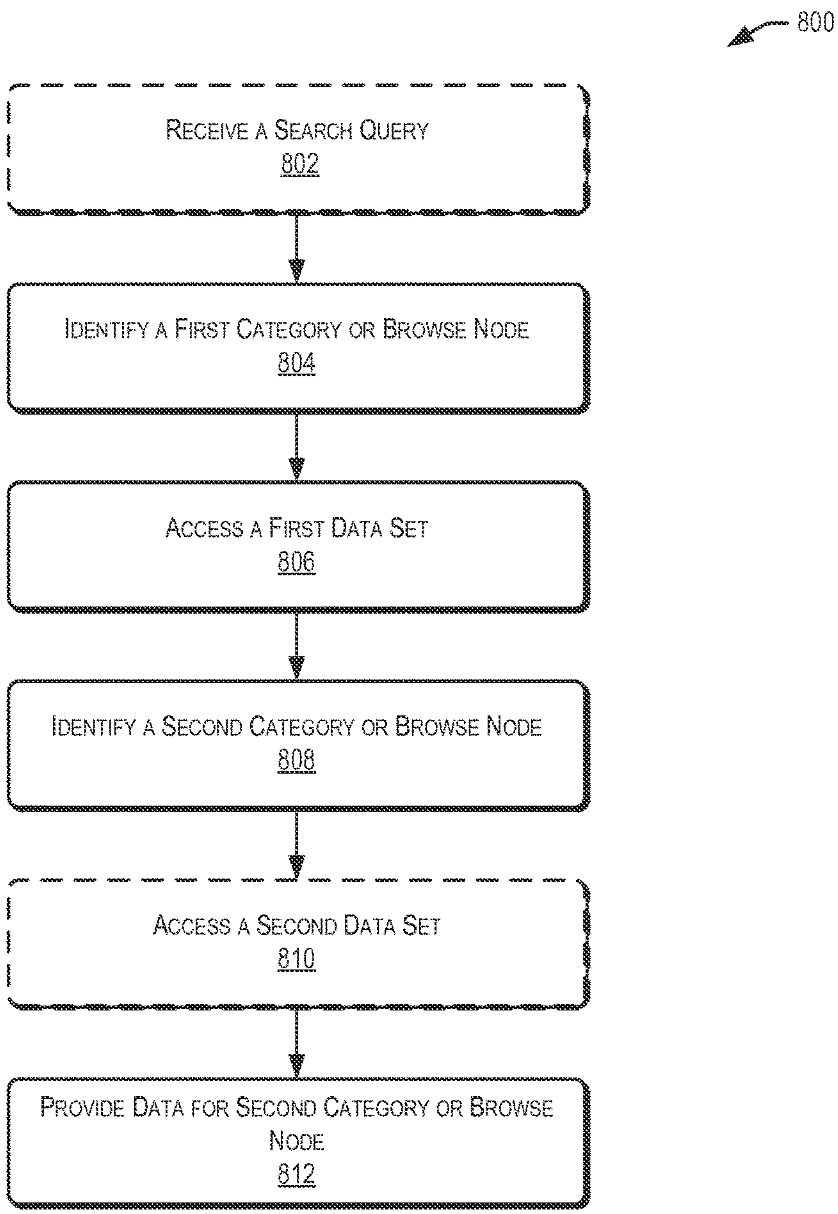
FIG. 8 illustrates an example flow diagram for providing category predictions described herein, according to at least one example.

FIG. 8 illustrates an example flow diagram for predicting a search category described herein, according to at least one example. In some examples, the one or more prediction management computers 210 (e.g., utilizing at least one of the query module 236, the browse node probability module 238, the user experience module 240, and/or the data module 242) or one or more user devices 204 shown in FIG. 2 may perform the process 800 of FIG. 8. The process 800 may begin at 802 by optionally receiving a search query (e.g., from a user). For example, the search query can include a keyword. The keyword may be associated with an item identifier. At 804, the process 800 may include identifying a first category or browse node. At 806, the process 800 may include accessing a first data set. For example, the first data set may be associated with the first category or browse node. The first data set can include item identifiers, an identification of one or more items, a first number of searches for the items, keywords, categories or browse nodes of items, or a relevance value associated with the search term and an action performed by other users.

At 808, the process 800 may include identifying a second category or browse node. The second category or browse node may be identified when the first data set includes the first number of searches for the items that is less than a threshold. In some examples, the second category or browse node is associated with more search queries during a time frame than the first category or browse node. At 810, the process 800 may optionally include accessing a second data set. For example, a second data set associated with the second category or browse node may be accessed that includes a second number of searches for the items. In some examples, the second data set includes at least one similar item as the first data set. Further in some examples, the process 800 may end at 812, where the process 800 may include providing data for the second category or browse node. For example, when the second number of searches for the items is greater than the threshold, the data may be provided.

The data may be used to enable adjustment of a user interface on a display on a computing device or a user experience. In some examples, adjusting the user experience provides a different layout on a user interface for the user to browse through the data that corresponds with the second category or browse node, provides a recommendation for items associated with the second category or browse node, provides a display of best-selling items from the second category or browse node on a user interface of the computing device, or provides an advertisement for a second item associated with the second category or browse node.

Figure 9:
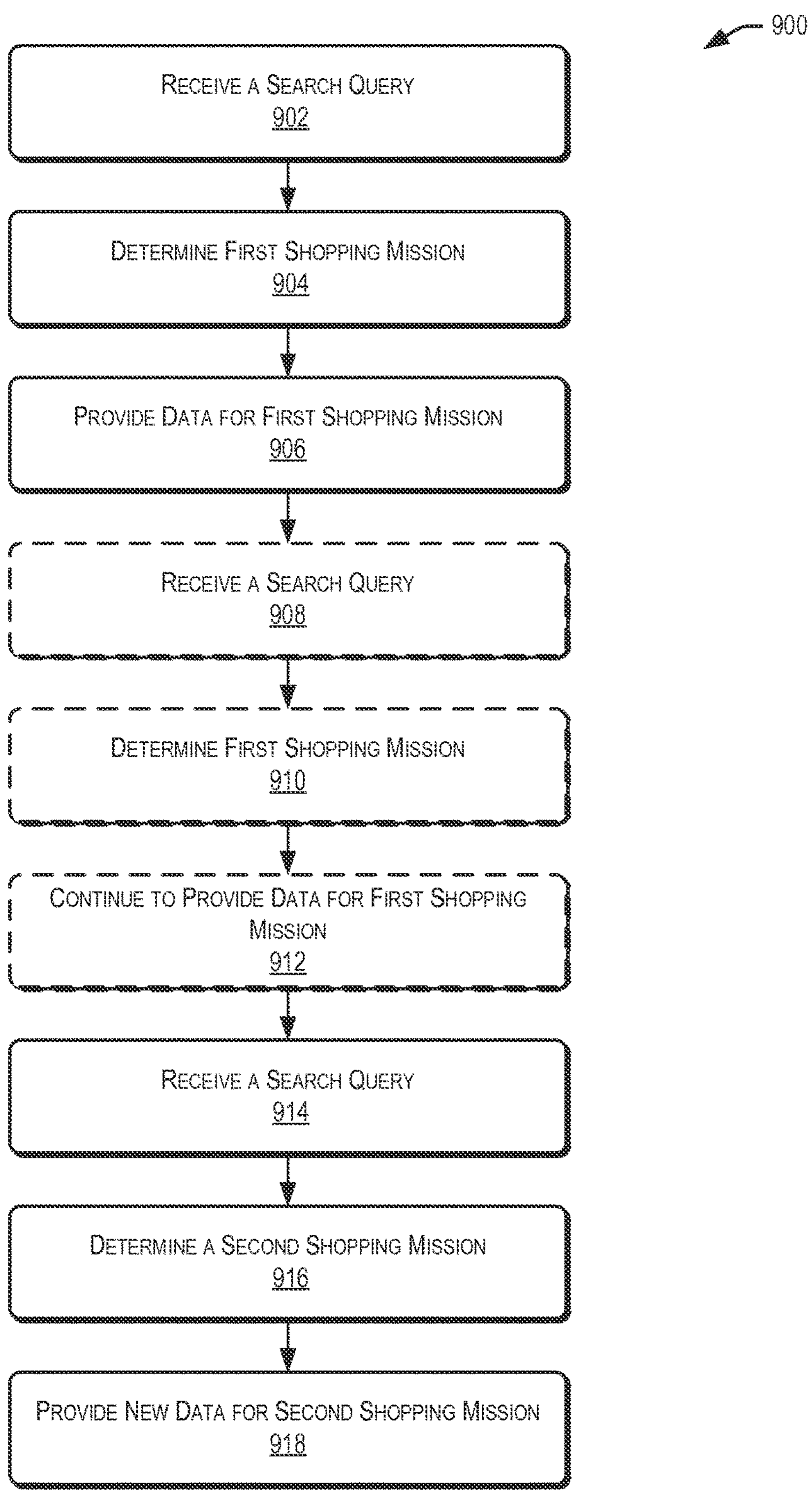
FIG. 9 illustrates an example flow diagram for providing category predictions described herein, according to at least one example.

FIG. 9 illustrates an example flow diagram for predicting a search category described herein, according to at least one example. In some examples, the one or more prediction management computers 210 (e.g., utilizing at least one of the query module 236, the browse node probability module 238, the user experience module 240, and/or the data module 242) or one or more user devices 204 shown in FIG. 2 may perform the process 900 of FIG. 9. The process 900 may begin at 902 by receiving a first search query. In some examples, the first search query is received from a user. At 904, the process 900 may include determining a first shopping mission. For example, the first shopping mission may be associated with the first query. At 906, the process 900 may include providing data for the first shopping mission.

At 908, the process 900 may optionally include receiving a second query. In some examples, the second search query is received from the user. At 910, the process 900 may optionally include determining the first shopping mission. For example, the determination may include that the first shopping mission is associated with the second search query and the first search query. At 912, the process 900 may optionally include continuing to provide data for the first shopping mission.

At 914, the process 900 may include receiving a third search query. In some examples, the third search query is received from the user. At 916, the process 900 may include determining a second shopping mission. For example, the second shopping mission may be determined based in part on data associated with the third search query and/or actions from other users relating to the third search query. In some examples, the first shopping mission or second shopping mission is associated with ordering one or more items through an electronic marketplace.

In some examples, the first shopping mission is associated with a first category and the second shopping mission is associated with a second category. The first category and second category may be determined by implementing a process to identify the category associated with the one or more keywords of the first search query, first data set, second search query, or second data set. For example, the process can include one of the following: simple prediction, smoothed browse node prediction, expanded query group, N-Gram generative model, estimated probability as prior, or interpolation between multiple prediction models. In some examples, the third search query may be referred to as a second search query when the process does not include 908, 910, and 912.

Further in some examples, the process 900 may end at 918, where the process 900 may include providing new data for the second shopping mission. The new data may enable adjustment of a user interface on a display on a computing device and/or a user experience. In some examples, adjusting the user experience provides a different layout on a user interface for the user to browse through the new data, provides a recommendation for items associated with the new data, provides a display of best-selling items from the new data on a user interface of the computing device, or provides an advertisement for an item associated with the new data.

Illustrative methods and systems for providing image analysis/management are described above. Some or all of these systems and methods may, but need not, be implemented at least partially by architectures such as those shown at least in FIGS. 1-9 above.

Figure 10:
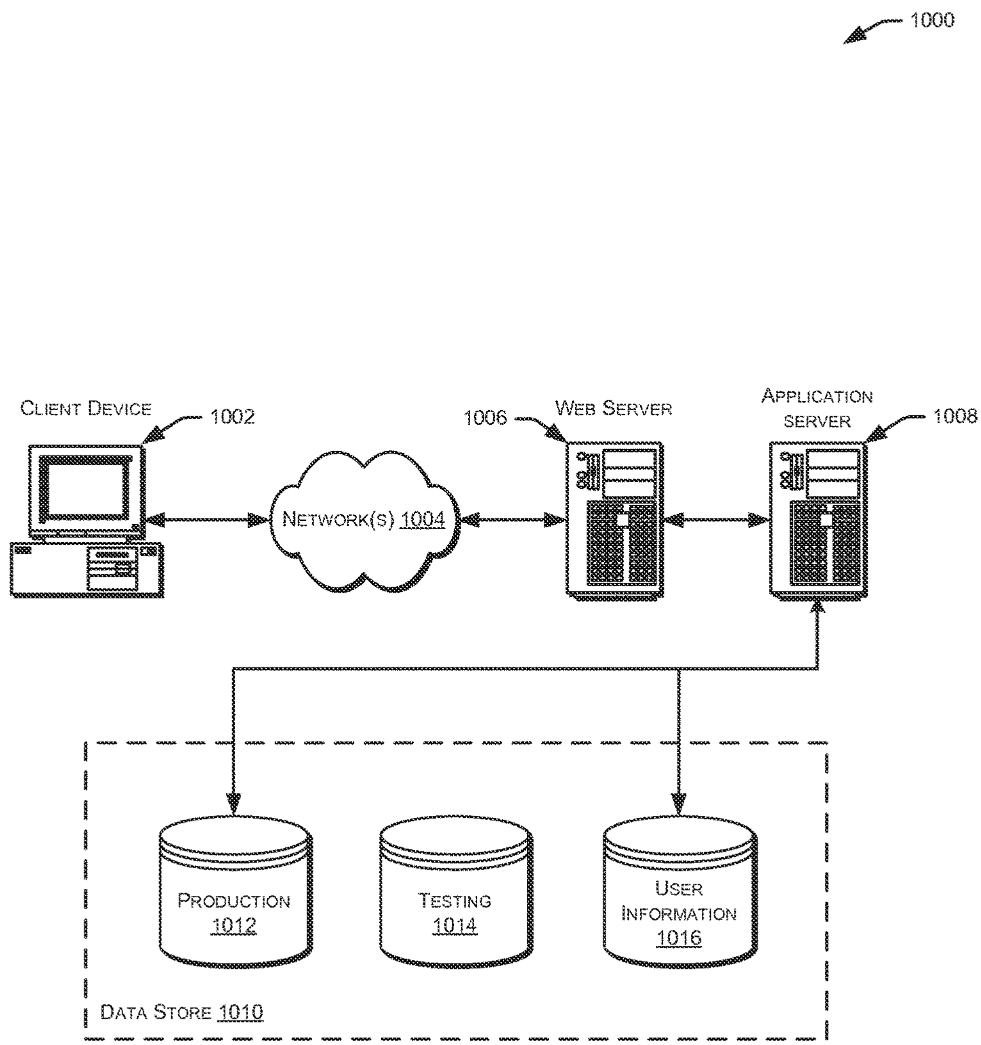
FIG. 10 illustrates an environment in which various embodiments of providing category predictions described herein can be implemented, according to at least one example.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl®, Python® or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving, by a computer system hosting a web site, a first search query from a user via a graphical user interface (GUI) configured to present a search field of the web site, and the first search query being associated with a first category from a browse taxonomy graph of the web site;

collecting, by the computer system, conversion data or click stream data during an activation of a session identifier for the user, and the session identifier associated with the GUI that received the first search query;

determining, by the computer system, a second category from the browse taxonomy graph of the web site based at least in part on the conversion data or the click stream data;

associating the first category and the second category with a first shopping mission;

determining, by the computer system, a first layout of the GUI from a database to present query result data associated with the first shopping mission, the database identifying the first layout as an image-heavy layout based at least in part on the association of the first category and the second category with the first shopping mission;

adjusting, by the computer system, the GUI to the first layout such that the query result data associated with the first shopping mission is presented via the GUI in a web page of the web site according to the image-heavy layout;

receiving, by the computer system, a second search query from the user via the GUI based at least in part on the search field of the web site;

determining, by the computer system, that the first shopping mission is associated with the second search query based at least in part on the conversion data or the click stream data;

continuing, by the computer system, to provide the query result data associated with the first shopping mission via the GUI in the web page according to the image-heavy layout based at least in part on the association of the first shopping mission with the second search query;

receiving, by the computer system, a third search query from the user via the GUI based at least in part on the search field of the web site;

determining, by the computer system, a second shopping mission associated with the third search query based at least in part on the conversion data or the click stream data, the second shopping mission being different than the first shopping mission;

determining, by the computer system, a second layout of the GUI from the database based at least in part on the association of the second shopping mission with the third search query, the second layout being identified in the database as a text-heavy layout; and adjusting, by the computer system, the GUI from the first layout to the second layout such that new query result data associated with the second shopping mission is presented via the GUI in the web page according to the text-heavy layout.

2. The computer-implemented method of claim 1, wherein the first shopping mission is associated with the first category and the second shopping mission is associated with a third category.

3. The computer-implemented method of claim 2, wherein the first category and third category are determined by implementing a process to identify a category associated with one or more keywords of the first search query, first data set, second search query, or second data set.

4. The computer-implemented method of claim 3, wherein the process includes one of the following: simple prediction, smoothed browse node prediction, expanded query group, N-Gram generative model, estimated probability as prior, or interpolation between multiple prediction models.

5. The computer-implemented method of claim 4, wherein the simple prediction uses a formula:

$$P(\text{Click}_x \mid Q) = \frac{\sum_N w_x \text{Click}_x}{\sum_N w_x}$$

wherein P is a probability, $\text{Click}_x$ is an observation of a click in browse node x, N is be a number of observations of query Q, and weight for an impression is $w_x$.

6. The computer-implemented method of claim 4, wherein the smoothed browse node prediction uses a formula:

$$P(\text{Click}_x \mid Q) = \frac{\sum_N w_x \text{Click}_x + \alpha}{\sum_N w_x + \alpha / P(\text{Click}_x)}$$

wherein P is a probability, α is a smoothing factor, $\text{Click}_x$ is an observation of a click in browse node x, N is a number of observations of query Q, $w_x$ is a weight for an impression, and $P(\text{Click}_x)$ identifies a prior for clicks in browse node x.

7. The computer-implemented method of claim 4, wherein the estimated probability as prior uses a formula:

$$P(\text{Click}_x \mid Q) = \frac{\sum \text{Click}_x + \alpha}{N + \alpha / P_{est}(\text{Click}_x \mid Q)}$$

wherein P is a probability, a is a smoothing factor, $\text{Click}_x$ is an observation of a click in browse node x, N is a number of observations of query Q, $w_x$ is a weight for an impression, and $P_{est}(\text{Click}_x|Q)$ identifies a prior for clicks in browse node x using an N-Gram-based estimate.

8. The computer-implemented method of claim 4, wherein the interpolation between multiple prediction models uses a formula:

$$P(\text{Click}_x|Q)=\Sigma\lambda_n P_n(\text{Click}_x|Q)$$

wherein P is a probability, $\text{Click}_x$ is an observation of a click in browse node x, $\lambda_n$ is learned parameters, and $P_n(\text{Click}_x|Q)$ is a probability of click given the first search query.

9. One or more non-transitory computer-readable storage media collectively storing computer-executable instructions that, when executed by one or more computer systems, configure the one or more computer systems to collectively perform operations comprising:

receiving a first search query from a user via a graphical user interface (GUI) configured to present a search field of a web site, and the first search query being associated with a first category from a browse taxonomy graph of the web site;

collecting conversion data or click stream data, the conversion data or the click stream data collected during an activation of a session identifier for the user, and the session identifier associated with the GUI that received the first search query;

determining a second category from the browse taxonomy graph of the web site based at least in part on the conversion data or the click stream data;

associating the first category and the second category with a first shopping mission;

determining a first layout of the GUI from a database to present data associated with the first shopping mission, the database identifying the first layout as an image-heavy layout based at least in part on the association of the first category and the second category with the first shopping mission;

adjusting the GUI to the first layout such that the data is presented via the GUI in a web page of the web site according to the image-heavy layout;

receiving a second search query from the user, the second search query received via the GUI based at least in part on the search field of the web site;

determining a second shopping mission associated with the second search query based at least in part on the conversion data or the click stream data, the second shopping mission being different than the first shopping mission;

determining a second layout of the GUI from the database, the second layout being identified in the database as a text-heavy layout; and adjusting the GUI from the first layout to the second layout such that new data associated with the second shopping mission is presented via the GUI in the web page according to the text-heavy layout.

10. The one or more non-transitory computer-readable storage media of claim 9, the operations further comprising:

receiving a third search query from the user, the third search query received via the GUI associated with a display provided to the user;

determining that the first shopping mission is associated with the third search query based at least in part on the conversion data or the click stream data; and continuing to provide the data to the user associated with the first shopping mission.

11. The one or more non-transitory computer-readable storage media of claim 9, wherein the new data enables adjustment of a user experience.

12. The one or more non-transitory computer-readable storage media of claim 11, wherein adjusting the user experience provides a different layout on the GUI for the user to browse through the new data.

13. The one or more non-transitory computer-readable storage media of claim 11, wherein adjusting the user experience provides a recommendation for items associated with the new data.

14. The one or more non-transitory computer-readable storage media of claim 11, wherein adjusting the user experience provides a list of best-selling items from the new data on the GUI associated with a display provided to the user.

15. The one or more non-transitory computer-readable storage media of claim 11, wherein adjusting the user experience provides an advertisement for a second item associated with the first category.

16. A system, comprising:

a memory that stores computer-executable instructions; and a processor configured to access the memory, wherein the processor is configured to execute the computer-executable instructions to collectively at least:

receive a first search query from a user via a graphical user interface (GUI) configured to present a search field of a web site, and the first search query being associated with a first category from a browse taxonomy graph of the web site;

collect conversion data or click stream data during an activation of a session identifier for the user, and the session identifier associated with the GUI that received the first search query;

determine a second category from the browse taxonomy graph of the web site based at least in part on the conversion data or the click stream data;

associate the first category and the second category with a first shopping mission;

determine a first layout of the GUI from a database to present data associated with the first shopping mission, the database identifying the first layout as an image-heavy layout based at least in part on the association of the first category and the second category with the first shopping mission;

adjust the GUI to the first layout such that the data is presented via the GUI in a web page of the web site according to the image-heavy layout;

receive a second search query, the second search query received via the GUI based at least in part on the search field of the web site;

determine that the first shopping mission is associated with the second search query based at least in part on the conversion data or the click stream data;

continue to provide the data associated with the first shopping mission;

receive a third search query, the third search query received via the GUI based at least in part on the search field of the web site;

determine a second shopping mission associated with the third search query based at least in part on the conversion data or the click stream data;

determine a second layout of the GUI from the database, the second layout being identified in the database as a text-heavy layout; and adjust the GUI from the first layout to the second layout such that new data associated with the second shopping mission is presented via the GUI in the web page according to the text-heavy layout.

17. The system of claim 16, wherein the first search query is received from the user and the data is provided to the user in response to receiving the first search query.

18. The system of claim 16, wherein the determination of the first shopping mission or the second shopping mission is associated with actions from other users relating to other search queries.

19. The system of claim 16, wherein the determination of the first shopping mission or the second shopping mission is associated with a data set that comprises click data, an item identifier, and a number of times the item identifier was ordered during a time frame.

20. The system of claim 16, wherein the first shopping mission or the second shopping mission is associated with ordering one or more items through an electronic marketplace.

* * * * *